(12) United States Patent
Santoro et al.

(10) Patent No.: US 12,009,743 B2
(45) Date of Patent: Jun. 11, 2024

(54) METHOD OF OPERATING AN ELECTRONIC CONVERTER, CORRESPONDING CONTROL CIRCUIT AND ELECTRONIC CONVERTER

(71) Applicant: STMicroelectronics S.r.l., Agrate Brianza (IT)

(72) Inventors: Christian Leone Santoro, San Giuliano Milanese (IT); Domenico Tripodi, Milan (IT)

(73) Assignee: STMicroelectronics S.r.l., Agrate Brianza (IT)

(*) Notice: Subject to any disclaimer, the term of this patent is extended or adjusted under 35 U.S.C. 154(b) by 150 days.

(21) Appl. No.: 17/695,603

(22) Filed: Mar. 15, 2022

(65) Prior Publication Data
US 2022/0311329 A1    Sep. 29, 2022

(30) Foreign Application Priority Data
Mar. 25, 2021  (IT) .......................... 102021000007286

(51) Int. Cl.
| H02M 1/36 | (2007.01) |
| H02M 1/00 | (2006.01) |
| H02M 1/32 | (2007.01) |
| H02M 3/335 | (2006.01) |

(52) U.S. Cl.
CPC ............ *H02M 1/36* (2013.01); *H02M 1/0006* (2021.05); *H02M 1/0025* (2021.05); *H02M 1/32* (2013.01); *H02M 3/33523* (2013.01)

(58) Field of Classification Search
CPC ........ H02M 1/32; H02M 1/0032; H02M 1/36; H02H 3/24; H02H 3/247; H02H 3/207; H02H 7/1222
See application file for complete search history.

(56) References Cited

U.S. PATENT DOCUMENTS

| 2009/0086513 A1* | 4/2009 | Lombardo ........ H02M 3/33507 363/21.01 |
| 2009/0141523 A1 | 6/2009 | Sugawara |
| 2009/0268488 A1* | 10/2009 | Fujii ...................... H02M 1/36 363/49 |
| 2011/0148468 A1* | 6/2011 | Visconti ............ H03K 3/02337 327/63 |
| 2012/0032695 A1 | 2/2012 | Turchi et al. |

(Continued)

*Primary Examiner* — Gustavo A Rosario-Benitez
(74) *Attorney, Agent, or Firm* — Seed IP Law Group LLP

(57) ABSTRACT

A method of operating an electronic converter is provided in which a switching activity of a switching stage of the electronic converter is active or inactive based on a control signal, and the method includes operating the electronic converter, alternatively, in a first or a second mode. In the first mode, the status signal is initially asserted and is de-asserted in response to an amplitude of the input sensing signal failing to reach a first reference threshold value. In the second mode, the status signal is initially de-asserted and an auxiliary power supply signal is periodically varied with a variation period. After a time interval equal to the variation period, a comparison signal is asserted in response to an amplitude of the sensed signal reaching a second reference threshold value. The status signal is asserted based on conditions of the comparison signal and the periodically varying auxiliary power supply signal.

20 Claims, 9 Drawing Sheets

(56) References Cited

U.S. PATENT DOCUMENTS

| | | | |
|---|---|---|---|
| 2016/0141951 A1* | 5/2016 | Mao | H02M 1/36 |
| | | | 363/21.02 |
| 2016/0344283 A1* | 11/2016 | Lin | H02M 1/36 |
| 2018/0034380 A1* | 2/2018 | Chen | H02M 1/32 |
| 2018/0088651 A1* | 3/2018 | Su | H02H 7/1222 |
| 2018/0175738 A1* | 6/2018 | Kikuchi | H02J 1/102 |
| 2020/0127571 A1* | 4/2020 | Matsuda | H02M 1/32 |

* cited by examiner

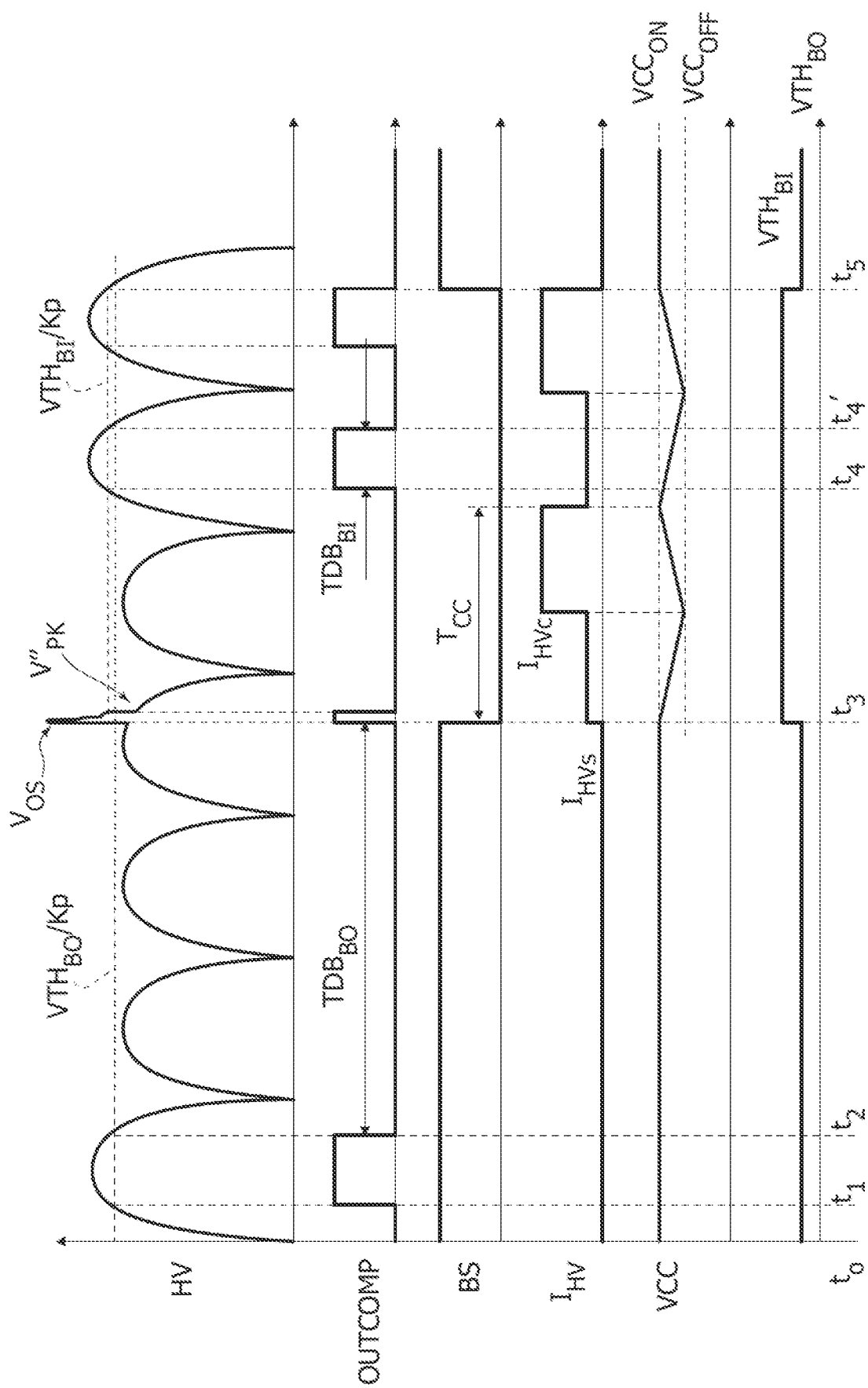

METHOD OF OPERATING AN ELECTRONIC CONVERTER, CORRESPONDING CONTROL CIRCUIT AND ELECTRONIC CONVERTER

BACKGROUND

Technical Field

The description relates to electronic converters, such as single stage "flyback" or multi-stage converter circuit topologies, for instance.

Electronic converters may be used in switch-mode power supply circuits to convert an AC input voltage power supply into a regulated DC power supply, for instance.

Description of the Related Art

Electronic AC-to-DC converters are integrated circuits, briefly ICs, used in (switch-mode) power supply circuits to convert an AC input power supply waveform into a regulated DC output power supply.

Associated to these converters there is a monitoring function of mains voltage conventionally referred to as "brown-out/brown-in monitoring". This function comprises disabling (brown-out) or enabling (brown-in) the switching activity of the converter based on the value of the mains input voltage.

As used herein "brown-out" refers to a protection of the converter circuit from unexpected low levels of the mains input voltage, that is from any case in which the input signal fails to reach a minimum, normal operation threshold. When the unexpected low levels of the input last for some time, the converter may suffer from overheating due to a higher current absorption by the converter circuit.

Notionally, the protection involves switching off the converter during the brown-out and re-enable it (brown-in) only after the mains input voltage return to a certain threshold.

At the same time, existing solutions may suffer from one or more of the following drawbacks, e.g., due to system non-idealities:
  when the system enters the brown-out state by interrupting the switching activity of the converter, there may be an overshoot in the (monitoring) voltage level, especially when the converter works with high loads;
  when a matching network is used, such as an electromagnetic interference (EMI) filter, for instance, a leakage inductance may be not negligible and be energized just before the interruption of the switching activity, potentially leading to parasitic voltage spikes on the (monitoring) voltage;
  after the event of parasitic voltage spikes, a residual offset can remain on the (monitoring) voltage level, e.g., due to charged capacitances of the EMI filter;
  possibility that any unbalance of the common mode capacitors in the EMI filter leads to a slow increase over time (drift) of the (monitoring) voltage level.

These drawbacks can trigger a spurious brown-in and lead to (undesired) system restarts in conditions which are not safe for the converter.

BRIEF SUMMARY

One or more embodiments of the present disclosure contribute in providing an improved solution to overcome the aforementioned drawbacks.

A control method involving introducing an operation of waiting for a certain time interval (e.g., "blanking") before detecting any brown-in condition after entering the brown-out state is provided in accordance with embodiments of the present disclosure.

One or more embodiments may relate to a corresponding control circuit.

One or more embodiments may relate to a corresponding electronic converter (e.g., flyback or multi-stage).

One or more embodiments may facilitate countering any undesired restart of the converter as soon as it enters the brown-out state (that is, as soon as it stops switching).

One or more embodiments may advantageously reduce silicon area footprint of the converter circuit, e.g., the circuit being exempt of any peak detector and/or complex filtering system.

One or more embodiments may reduce or eliminate any residual offset and (slow) increase on the voltage level, e.g., at a high-voltage (HV) monitoring pin.

One or more embodiments may exploit recycling a biasing signal VCC during a brown-out phase to mask a brown-in condition.

One or more embodiments may use a circuit block to generate a minimum current to discharge capacities of the EMI filter, compensating circuit non-idealities.

BRIEF DESCRIPTION OF THE SEVERAL VIEWS OF THE DRAWINGS

One or more embodiments will now be described, by way of non-limiting example only, with reference to the annexed Figures, wherein:

FIG. 8 represents time diagrams of signals in one or more embodiments.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings are in simplified form and are not to precise scale.

Throughout the figures annexed herein, unless the context indicates otherwise, like parts or elements are indicated with like references/numerals and a corresponding description will not be repeated for brevity.

Figure 1:
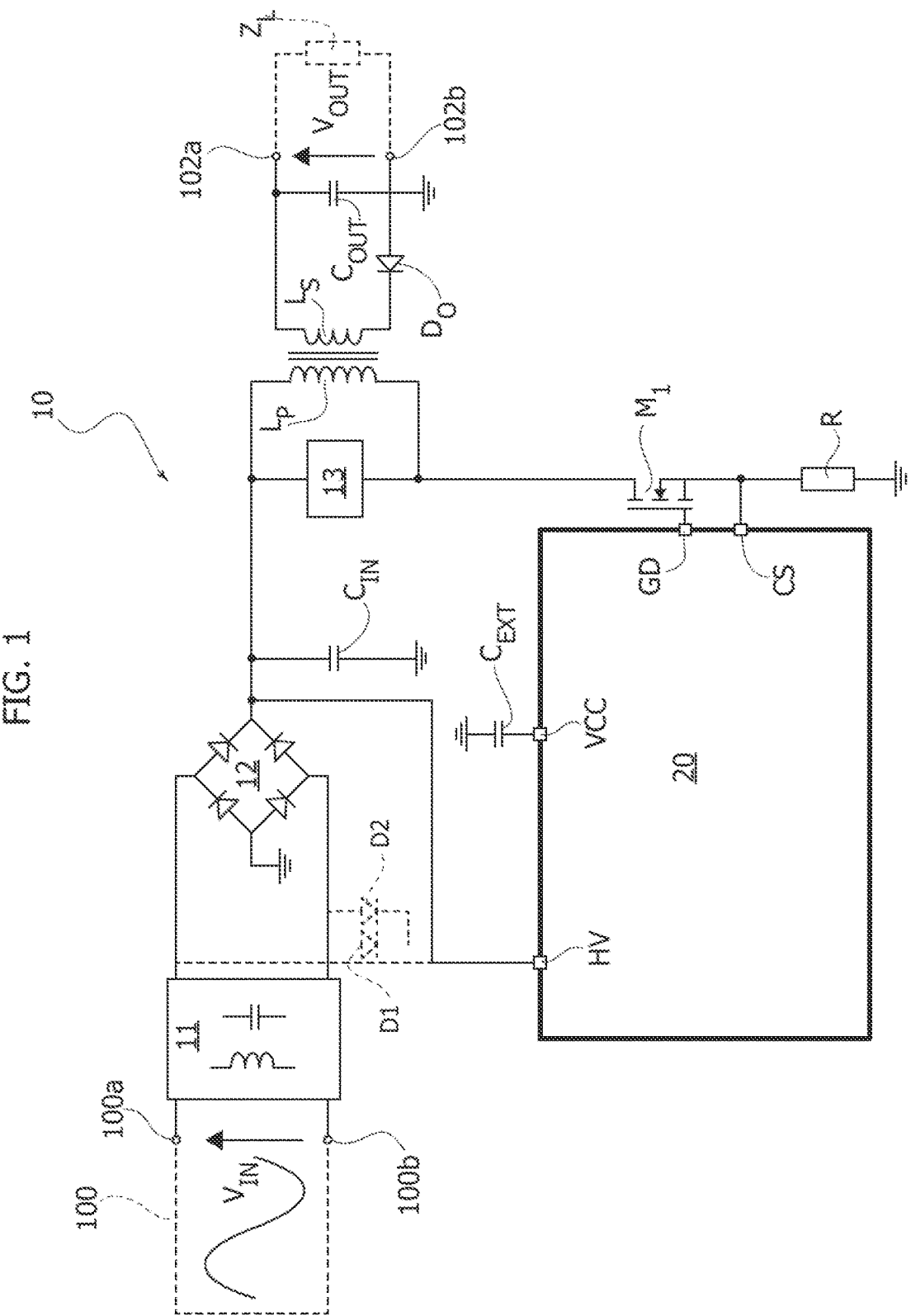
FIGS. 1 and 1A are diagrams exemplary of electronic converter circuits.
Figure 1A:
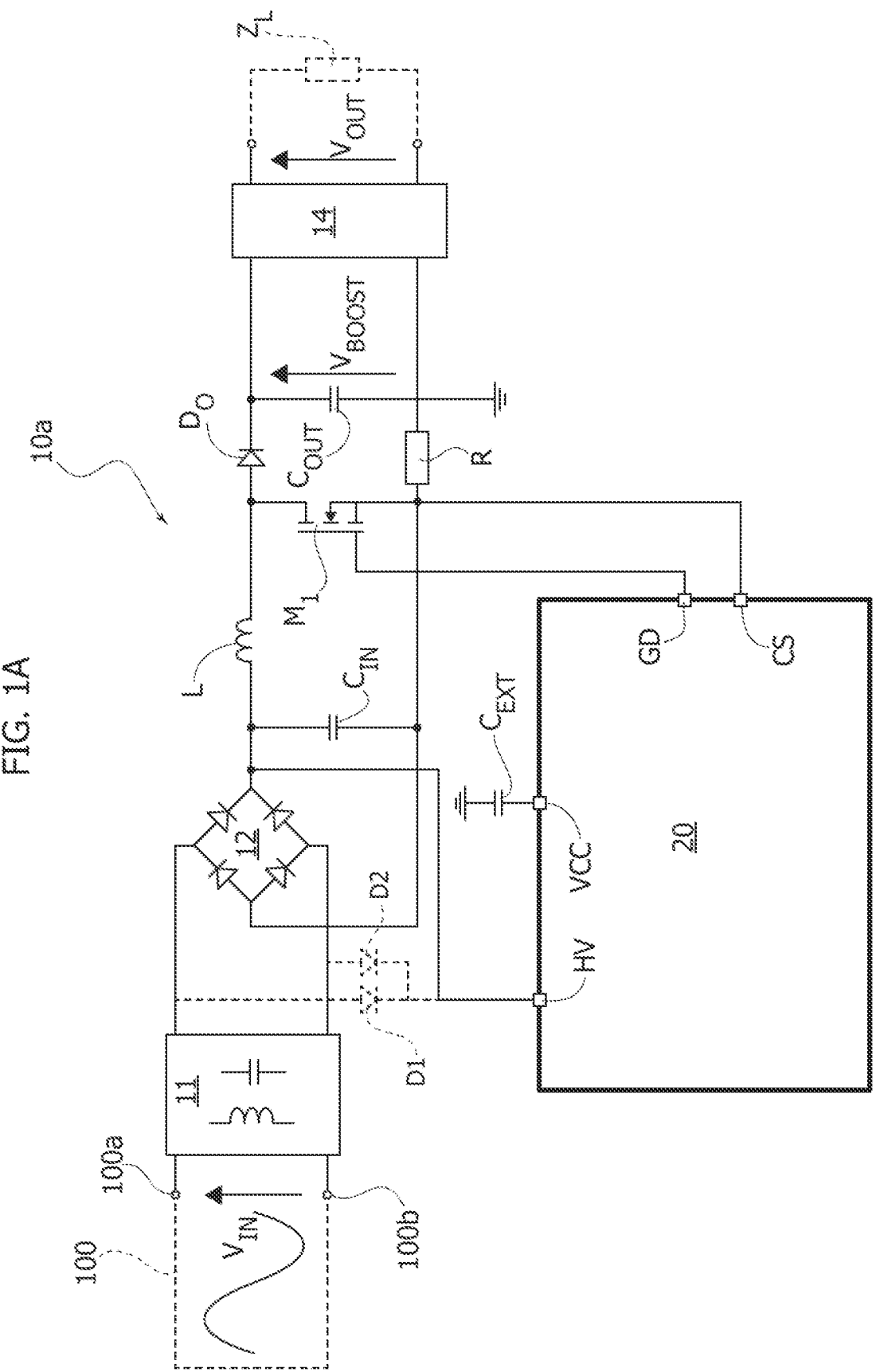

FIGS. 1 and 1A show a single stage flyback-type electronic converter 10 and a double stage electronic converter 10a.

As exemplified in FIG. 1, a conventional flyback converter comprises:

input nodes 100a, 100b configured to be coupled to a main source (briefly, mains) 100 of alternate-current (AC) electrical energy to receive an oscillating power supply signal VIN therefrom;

output nodes 102a, 102b configured to be coupled to a load to provide an output voltage level VOUT thereto, an input matching network 11, e.g., an electromagnetic-interference (EMI) filter network comprising a set of inductances and/or capacitances, a rectifier bridge 12 coupled to the input nodes 100a, 100b via the matching network 11, the rectifier bridge 12 configured to receive the input AC voltage VIN and to provide a rectified signal as an output;

a capacitance CIN coupled to the rectifier bridge 12;

a transformer LP, LS with a primary side LP coupled to the input nodes 100a, 100b and a secondary side LS coupled to the output nodes 102a, 102b, the transformer LP, LS having a first inductance LP, with a first number of turns, on the primary side and a second inductance LS, with a second number of turns, on the secondary side LS, where a ratio between the first number of turns and the second number of turns is equal to n; a magnetic core of the transformer LS, LP stores energy from primary side LP and releases it to the secondary side LS;

optionally, dissipative snubber circuits 13 coupled to the primary side LP of the transformer LP, LS, the snubber circuits 13 suitable to mitigate non-idealities in the magnetic coupling of the transformer windings LP, LS, in a manner known per se;

a controlled switch M1, e.g., a transistor made in any known semiconductor technology, coupled to the transformer LS, LP, the switch M1 configured to switch between a first and a second state based on a control signal GD, the switch M1 configured to activate accumulation of energy from the input VIN on the primary side LP of the transformer LP, LS when in the first, e.g., ON, state and to deactivate such an accumulation when in the second, e.g., OFF, state; the energy storage period is also called TON, referring to the corresponding "ON" state of the switch M1, while the full switching period is indicated as period T, e.g., T=TON+TOFF;

a rectifier D0, such as a diode or an active structure (e.g., a synchronous rectifier), coupled to the second inductance LS and to the output node 102b, the rectifier D0 configured to become active during the release of the energy to the secondary side LS and to be inhibited during the energy storage phase on the primary side LP;

an output capacitor COUT coupled to the rectifier D0 and to the output nodes VOUT, the capacitor COUT configured to filter the switching activity of the switch M1 to provide a continuous voltage or current to a load;

a control circuit 20 comprising a plurality of input/output terminals or nodes HV, VCC, CS, GD.

Specifically, the control circuit 20 as exemplified in FIGS. 1 and 1A comprises:

a first input node HV configured to receive a signal HV indicative of input voltage VIN, a second input node VCC configured to receive a biasing voltage level VCC, for instance by being coupled to a power supply arrangement such as an auxiliary winding of the transformer, a diode and an external capacitor CEXT (for simplicity, the latter being indicated in FIGS. 1 and 2) arranged, in a manner per se known, to provide energy to operate the control circuit 20 during the switching activity;

a third input node CS configured to receive a signal CS indicative of a switching activity of the converter circuit 10, 10a, e.g., indicative of a current flowing through the inductance LP of the primary side of the transformer LP, LS;

an output node GD configured to control the switch M1 via one or more control signals GD applied thereto.

As exemplified in FIGS. 1, 1A, the first input node HV is alternatively connected downstream (in solid lines in FIGS. 1 and 2) or upstream (in dashed lines in FIGS. 1 and 2) of the rectifier bridge 12, e.g., via diodes D1 and D2 (when arranged upstream). For instance, if the HV pin is coupled via diodes D1, D2, the signal HV it receives has a rectified sinusoid waveform, where the peak value of such a waveform is a function of the mains input RMS voltage VRMS, namely $Vpk=\sqrt{2}*VRMS$.

As exemplified in FIGS. 1 and 1A, a sensing resistance R is coupled in series to the switch M1 and coupled to the control circuit 20, the resistor R configured to read a current CS flowing in the switch M1 and to provide a current measurement signal CS to the control circuit 20.

For the sake of simplicity, one or more embodiments are discussed in the following mainly with respect to the flyback topology, being otherwise understood that such a topology is purely exemplary and in no way limiting.

For instance, one or more embodiments may be suitable for the multi-stage electronic converter 10a as exemplified in FIG. 1A, where the transformer LP, LS of the circuit exemplified in FIG. 1 is replaced by inductance L and where the output nodes 102a, 102b are coupled to a DC-DC converter stage 14 configured to receive a first stage output voltage VBOOST and provide the output voltage VOUT of the converter 10a at output nodes 102c, 102d.

Figure 2:
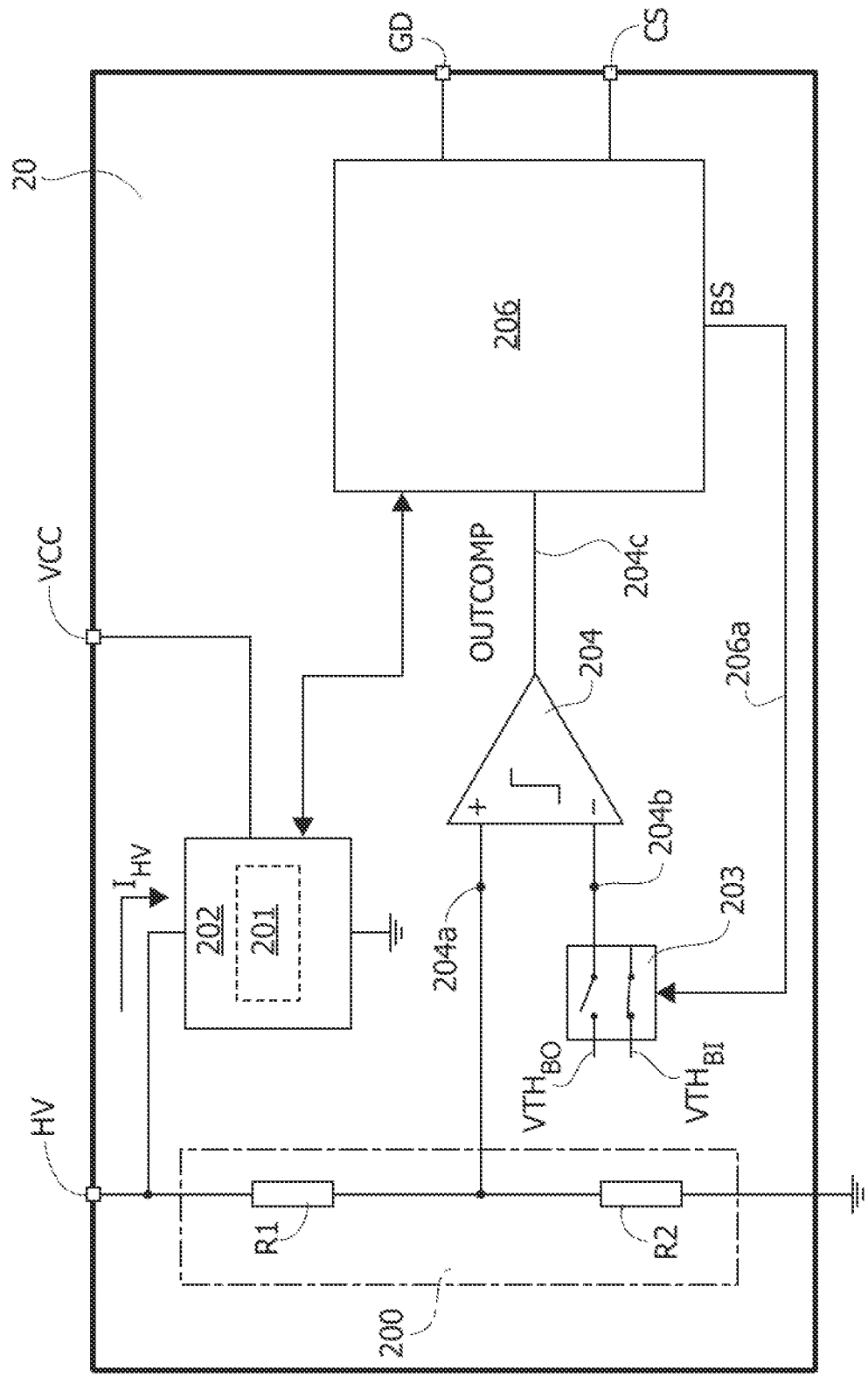
FIG. 2 is a diagram exemplary of a component illustrated in FIGS. 1 and 1A.

As exemplified in FIG. 2, the control circuit 20 of the converter 10, 10a may comprise a voltage divider 200, e.g., resistive voltage divider R1, R2, configured to receive a signal indicative of the mains input voltage from the first input node HV of the control circuit 20.

In one or more embodiments, the voltage divider 200 can alternatively be external or integrated within the control circuit 20, the latter option being exemplified in FIG. 2.

As exemplified in FIG. 2, the control circuit 20 may further comprise:

a start-up circuit block 202 coupled to the first HV and second VCC input nodes and to the voltage divider 200, the start-up circuit block 202 configured to provide an auxiliary power supply, e.g., via a current IHV as discussed in the following; optionally, the start-up circuit block 202 may comprise an x-cap discharge circuit block 201 configured to perform, in a manner per se known, an x-cap discharge function 201, in particular when the first input node HV is coupled to the input nodes 100a, 100b of the converter 10 via diodes D1, D2;

a threshold selecting circuit block 203 comprising one or more switches configured to be driven to be in a first "on" or a second "off" state by control signals, the threshold selecting circuit block 203 configured to provide as an output a reference threshold value VTH selected out of two or more pre-set reference threshold values VTHBO, VTHBI;

a comparator circuit block 204 having:
i. a non-inverting input node 204a coupled to the voltage divider 200, e.g., intermediate resistances R1, R2, and configured to receive therefrom the signal VD indicative of the input voltage Vin;
ii. an inverting input node 204b coupled to the threshold selecting circuit block 203 and configured to receive the selected threshold value VTH therefrom, and
iii. an output node 204c coupled to a logic block 206, where the comparator circuit block 204 is configured to perform a comparison between the voltage VD and the selected threshold VTH and to provide a comparison signal OUTCOMP at the output node 204c, with comparison signal OUTCOMP being indicative of the voltage VD reaching or failing to reach the reference threshold VTH, the logic circuit block 206 coupled to the output node 204c of the comparator circuit block 204, to the third input node CS and to the output node GD of the control circuit 20, the logic circuit block configured to receive the comparison signal OUTCOMP from the threshold selecting block 203, receive the signal CS from the third input node CS of the control circuit 20, and provide a status signal BS configured to drive the switches of the threshold selecting block 203 to select the reference threshold signal VTH.

As exemplified in FIG. 2, the logic circuit block 206 of the control circuit 20 is configured to drive, via the state signal BS, the reference threshold selecting circuit block 203 to select among the pre-set reference threshold values VTHBO, VTHBI:

a first reference threshold value VTHBO when the converter 10, 10a is in a brown-in state, and a second reference threshold value VTHBI when the converter 10, 10a is in a brown-out state, with the second reference threshold higher than the first one, e.g., VTHBI>VTHBO.

The switching activity of the electronic converter is driven by the periodic alternate switching of the output signal GD. When in the brown-out state, the output signal does not switch anymore, keeping its last (digital) value. In brown-in, periodic switching of the output signal GD restarts again.

When the controller as exemplified in FIG. 2 is used in the converter 10, 10a as exemplified in FIGS. 1 and 1A, the input voltage level Vin of the mains is monitored and the logic circuit block 206 activates (brown-in) or deactivates (brown-out) the switching activity of the converter 10, 10a by asserting/de-asserting the status signal BS.

As used herein, the term "asserting" means "making it active". It is noted that a signal can be active-high (positive logic) or active-low (negative logic). For instance, asserting the signal may mean "making it high" for positive logic and "making it low" for negative logic.

For the sake of simplicity, one or more embodiments are discussed herein with respect to an exemplary case in which signals are asserted in a positive logic, being otherwise understood that such an implementation is not mandatory and limiting.

For instance:
when the status signal BS is at the first, e.g., "high", value, the switching activity of the converter 10, 10a is active (brown-in state),
when the status signal BS is in a second, e.g., "low", value, the switching activity of the converter 10, 10a is deactivated (brown-out state).

In one or more embodiments, the logic circuit block 206 may vary the logic value of the status signal BS if the comparison signal OUTCOMP remains at a certain logic level for a certain debounce time interval. Specifically, a first debounce time interval TDBBO may be introduced for a transition towards a brown-out state, while a second debounce time interval TDBBI may be introduced for a transition towards a brown-in state. For instance, these debounce time intervals may differ, e.g., TDBBO>TDBBI.

For instance, the logic circuit block 206 can activate/deactivate the periodic alternate switching of the driving signal GD and assert the status signal BS based on a duration of a value of the output signal OUTCOMP reaching the respective brown-in/brown-out debounce times TDBBI, TDBBO.

Figure 3:
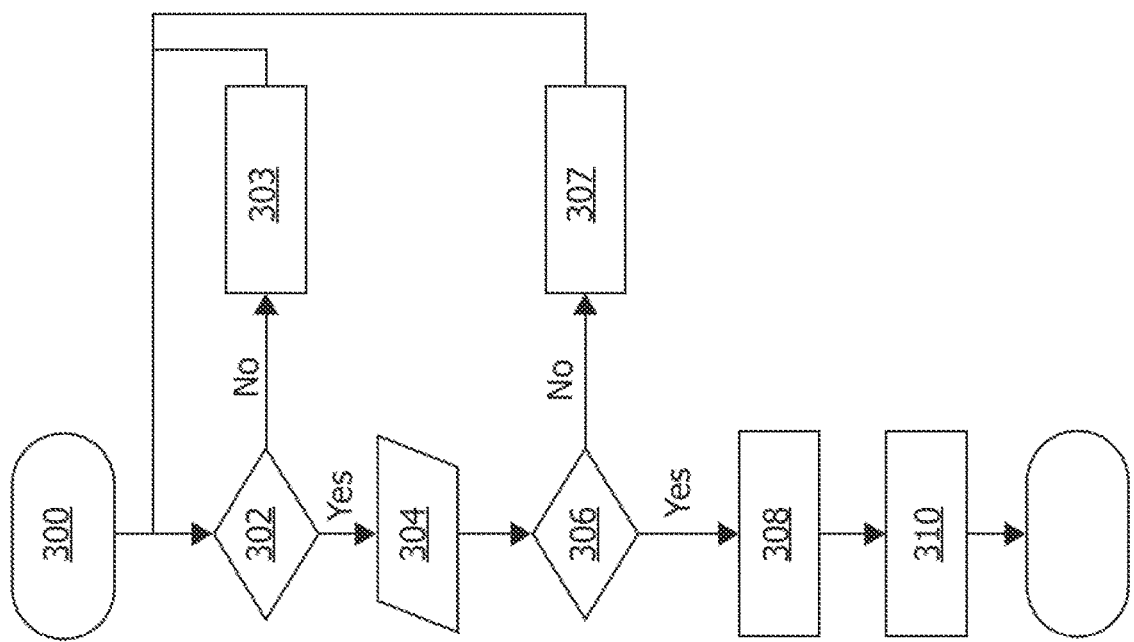
FIG. 3 is a flow-chart exemplary of steps or acts in a method of controlling an electronic converter according to FIGS. 1 and 1A.

FIG. 3 is a flowchart of the method of functioning of the control circuit 20.

As exemplified in FIG. 3, the method comprises:
block 300: initializing the converter 10, 10a in a brown-in state, sensing 200 a signal HV, VD indicative of the input signal VIN and selecting 203 the first reference threshold value VTHBO, block 302: performing a comparison 204 of the voltage divider signal VD and the selected 203 reference threshold value VTH, e.g., VD vs VTH=VTHBO, providing a comparison signal OUTCOMP as a result of such a comparison;

block 303: if the voltage divider signal VD exceeds the selected threshold VTH (e.g., VD>VTHBO), providing the comparison signal OUTCOMP with a first, e.g., "high" or "1", value, and block 304: if the voltage divider signal VD reaches or fails to reach the selected threshold VTH (e.g., VD<VTHBO), providing the comparison signal OUTCOMP with a second, e.g., "low" or "0", value.

As exemplified in FIG. 3, the method further comprises:
block 306: detecting a time length in which comparison signal OUTCOMP remains in the first, e.g., "low", state, and block 307: if the detected time length fails to reach the first debounce time interval value TDBBO (for instance, because the signal OUTCOMP is asserted "high" in the meanwhile), maintaining active the switching activity of the driving signal GD, and maintaining the status signal BS in the last state, e.g., "high" or "1", block 308: if the detected time length reaches the first debounce time interval value TDBBO, deactivating the switching activity of the signal GD, causing the converter circuit 10, 10a to enter the brown-out state and asserting the status signal BS, for instance switching its value to "low" or "0";

block 310: after the converter circuit 10, 10a has entered the brown-out state (e.g., BS="0"), selecting 203 the other selectable reference threshold value, e.g., the second reference threshold value VTHBI.

As exemplified in FIG. 3, block 310 is coupled to a terminator node but it is possible iterating method acts of blocks 302-306 using the threshold value set in block 310 as the "new" threshold in block 302.

Figure 4:
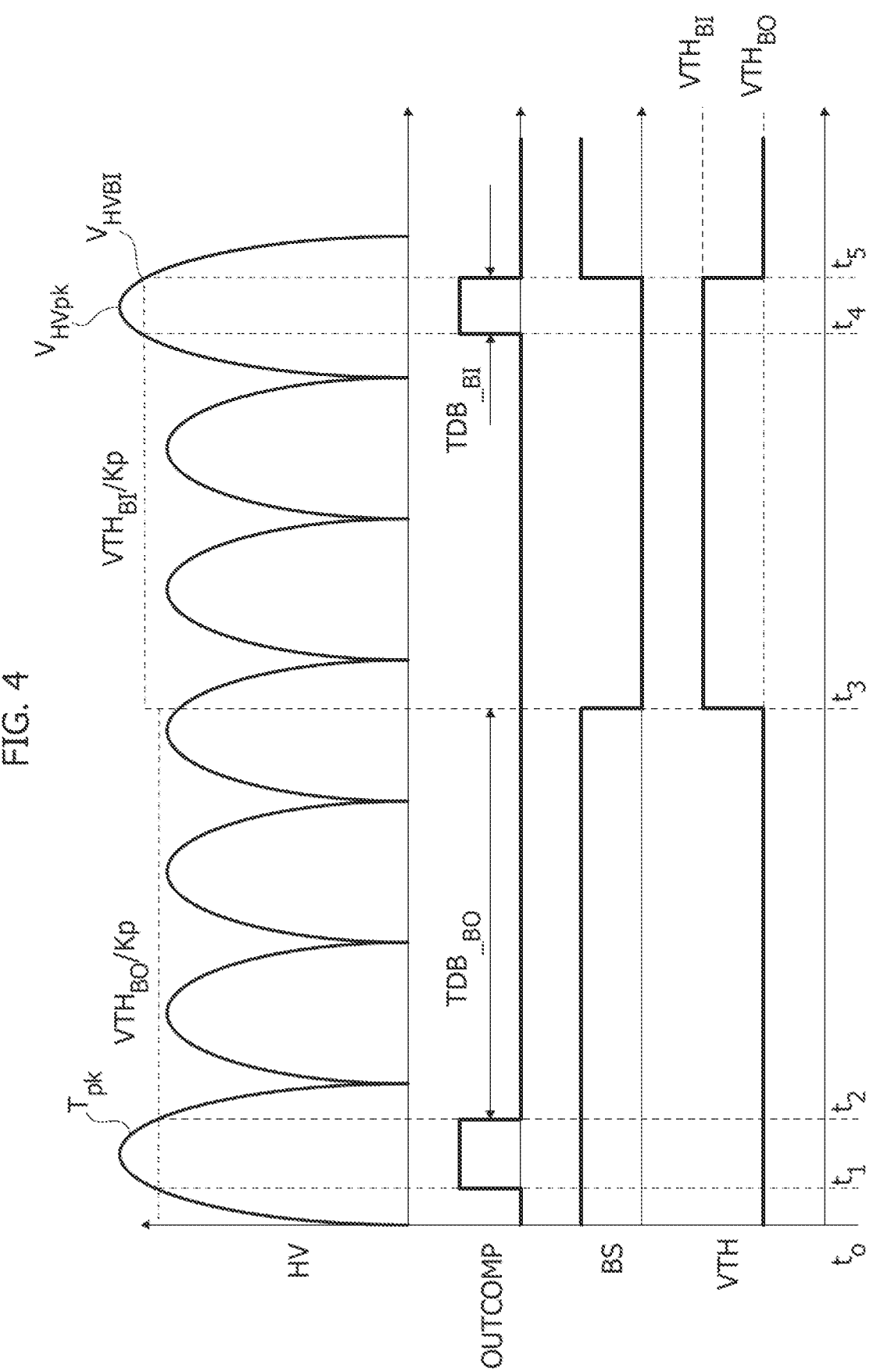
FIG. 4 represents possible time diagrams of signals which can occur in the method of FIG. 3.

FIG. 4 is an exemplary time diagram of signals HV, OUTCOMP, BS, VTH at respective nodes HV, 204c, 206a, 204b of the control circuit 20 during functioning of the circuit 20 as discussed with respect to FIG. 3.

In the case exemplified in FIG. 4, at an initial time instant t0:
- the input voltage at the first node HV of the control circuit 20 is zero,
- the switching signal BS is "high" so that the converter 10, 10a is in the brown-in state,
- the reference threshold VTH of the reference selecting circuit block 203 is set equal to the first threshold value VTHBO.

As exemplified in FIG. 4:
- from the initial time instant t0 until a first time instant t1, the input signal at the first node HV has a low amplitude so that the voltage divider signal VD fails to reach the threshold VTH, e.g., VTHBO and VD<VTH=VTHBO, and the comparator circuit block 204 outputs the comparison signal OUTCOMP with a first, e.g., "0", value;
- at a first time instant t1, the signal VD from the voltage divider 200 exceeds the brown-out threshold, e.g., VD=VHV*Kp=VHV*(R2/(R1+R2) and VD>VTH=VTHBO; consequently, comparison signal OUTCOMP switches to a second value, e.g., "1";
- at a second time instant t2, that is VHV<VTHBO/Kp, the signal VD from the voltage divider 200 fails to reach the brown-out threshold, e.g., VD=VHV*Kp<VTHBO; consequently, comparison signal OUTCOMP switches to the second value, e.g., "0";
- at a third time instant t3, the logic circuit block 206 detects that the voltage peak of the signal at the input node HV has been lower than the brown-out threshold VTHBO for a time interval equal to the debounce time interval TDBBO, so the converter 10, 10a goes into the brown-out state (e.g., BS="low"), therefore switching is disabled and the reference threshold circuit block 203 is driven so as to select the second threshold value VTHBI;
- at a fourth time interval t4, the signal VD from the voltage divider 200 reaches the brown-in threshold, e.g., VD=VHV*Kp>VTH=VTHBI; consequently, the comparison signal OUTCOMP goes back to the initial value;
- at a fifth time interval t5, the logic circuit block 206 detects that the amplitude VHVBI of the signal at the input node HV has been higher than the brown-in threshold VTHBI for a time interval equal to the second debounce time interval TDBBI (e.g., TDBBI=1 milliseconds), so the converter 10, 10a goes into the brown-in state (BS="high"), therefore switching is enabled and the reference threshold circuit block 203 selects the first threshold value VTHBO.

In general, the value of the first debounce time interval TDBBO can be set flexibly based on the application of the converter circuit 10, 10a. For instance, TDBBO may be set to a relatively low value (e.g., TDBBO=0.064 seconds) to limit tolerance of temporary mains voltage drops whose duration ends in a few (e.g., 2-3) sinusoid cycles. Conversely, TDBBO can be set to a relatively high value (e.g., TDBBO=0.630 second) in cases where electro-medical equipment is addressed, so as to avoid switching off the converter while the input network is replaced by an Uninterruptible Power Supply (UPS) in the event that there is an interruption of the electricity.

Conversely, the value of the second debounce time interval TDBBI may take into account the following.

As exemplified in FIG. 4, at time instant t5 the amplitude of the signal VD exceeds the second reference threshold value VTHBI, that is VD>VTHBI for a time equal to the second debounce time interval TDBBI.

As a result, the TDBBI debounce time introduces an error "ε"_"pk" that causes a shift, with respect to the threshold VHVBI, of the HV signal value at which the converter 10, 10a enters the brown-in state. Such an error "ε"_"pk" may be expressed as:

$$\varepsilon_{pk} = \frac{V_{HVpk} - V_{HVBI}}{V_{HVpk}} = \frac{1}{\sin\left[\frac{\pi}{2}\left(1 - \frac{T_{DB_{BI}}}{T}\right)\right]} - 1$$

where
VHVpk is the peak amplitude of the signal at the HV node,
VHVBI is the amplitude of the input signal HV at which the voltage divider signal VD exceeds the second reference threshold value VTHBI, that is VHVBI=VTHBI/Kp, for a time of TDBBI;
T is the inverse of the frequency of the input mains VIN AC signal.

Figure 5:
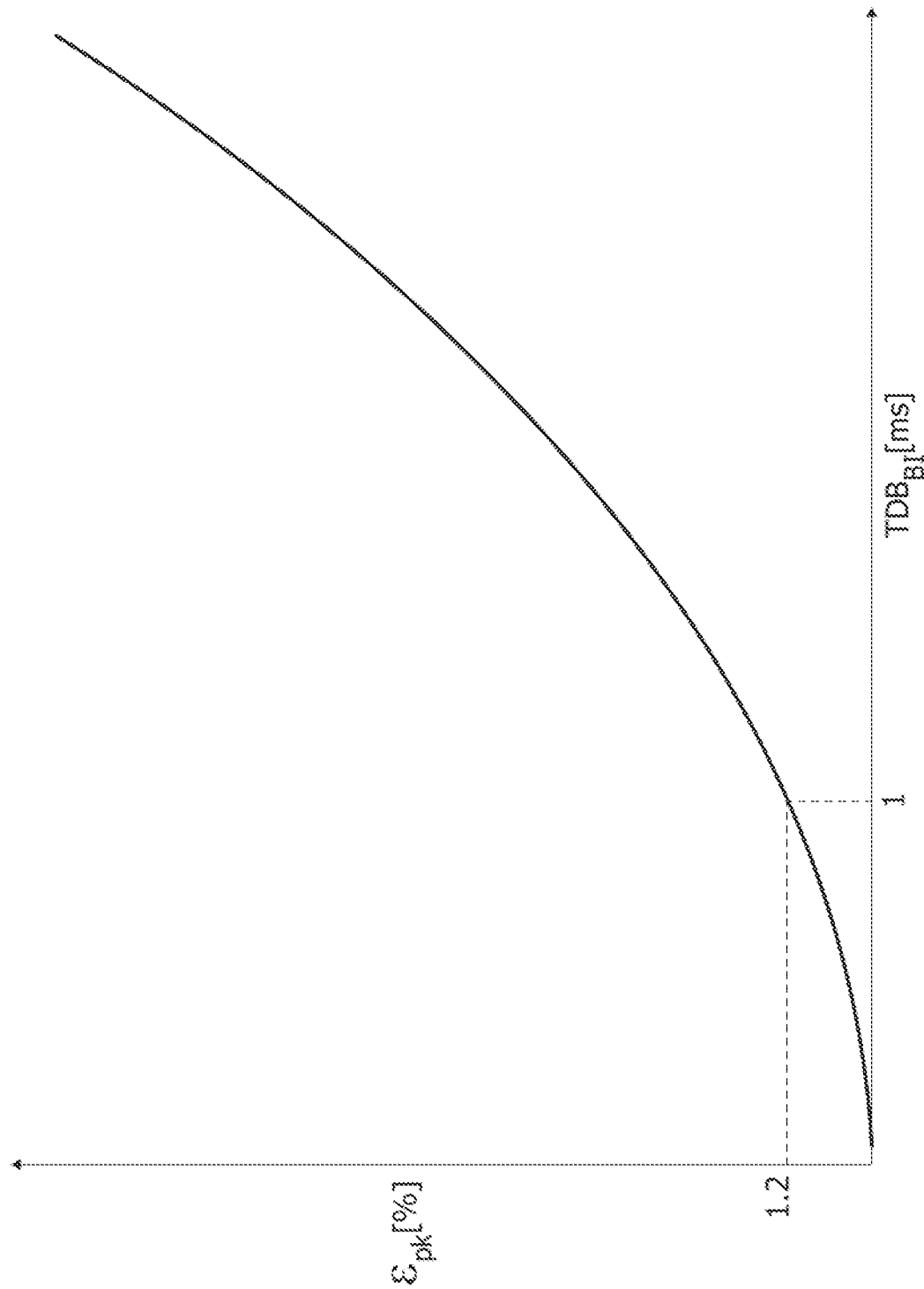
FIG. 5 is an exemplary diagram of an error function.

FIG. 5 shows a plot of the error function "ε" "pk" (ordinate scale in percentage units), versus the values of the second debounce time interval value TDBBI (abscissa scale, millisecond units), for an input mains voltage frequency of (about) 50 Hz. For instance, selecting a debounce time interval value TDBBI=0.001 s leads to an error on the brown-in threshold about 1.2%.

In order to counter risks of introducing non-negligible error on the brown-in threshold, the choice of the value of TDBBI may be limited.

It is noted that coupling the HV node downstream of the rectifier bridge 12 may facilitate overcoming such limits, as in such an arrangement the voltage on the HV pin is a DC voltage that follows the peaks of the input voltage, thanks also to the input "tank" capacity Cin coupled to the diode bridge 12.

Figure 6:
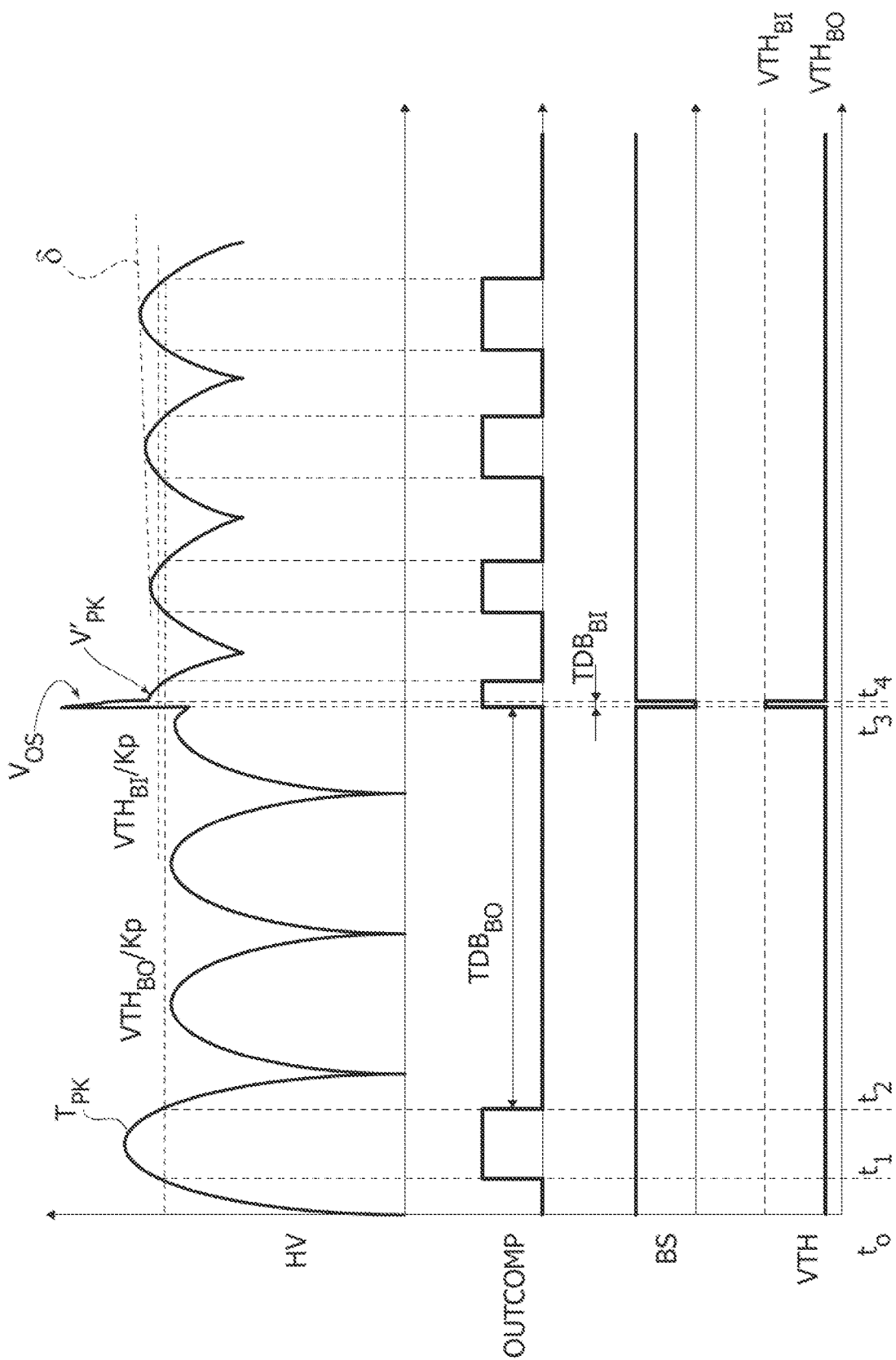
FIG. 6 represents, by way of comparison with FIG. 4, non-ideal time behaviors of signals.

FIG. 6 is a further time diagram of signals HV, OUTCOMP, BS, VTH at respective nodes HV, 204c, 206a, 204b in a different scenario from that exemplified in FIG. 4, such as a scenario taking into account non-idealities of the operation of the converter circuit 10, for instance.

As exemplified in FIG. 6, when the system enters the brown-out state (e.g., at time instant t3, BS="low"), there may be a spike or overshoot VOS in the signal at the HV node voltage, due to non-idealities in the matching network 11. As known to those of skill in the art, this may be a result of the converter 10 being coupled to high loads and of a non-negligible leakage inductance of the network 11. For instance, this spike Vos has an amplitude about tens of Volts and lasts about hundreds of microseconds. As known to those of skill in the art, after the spike Vos the following phenomena can further occur:
- a residual offset (e.g., 30-50 Volts) of the peak value Vpk' at the HV node, because the EMI filter 11 capacitances have been charged, for instance;

a slow increase over time (drift) 6 of the signal at the HV node.

As exemplified in FIG. 6, due to these non-idealities, at time t4 the logic block 206 of the control circuit 20 may trigger brown-in (e.g., at time instant t4) despite the conditions for adequate brown-in are not present yet (e.g., VHVpk*Kp<VTHBI).

Figure 7:
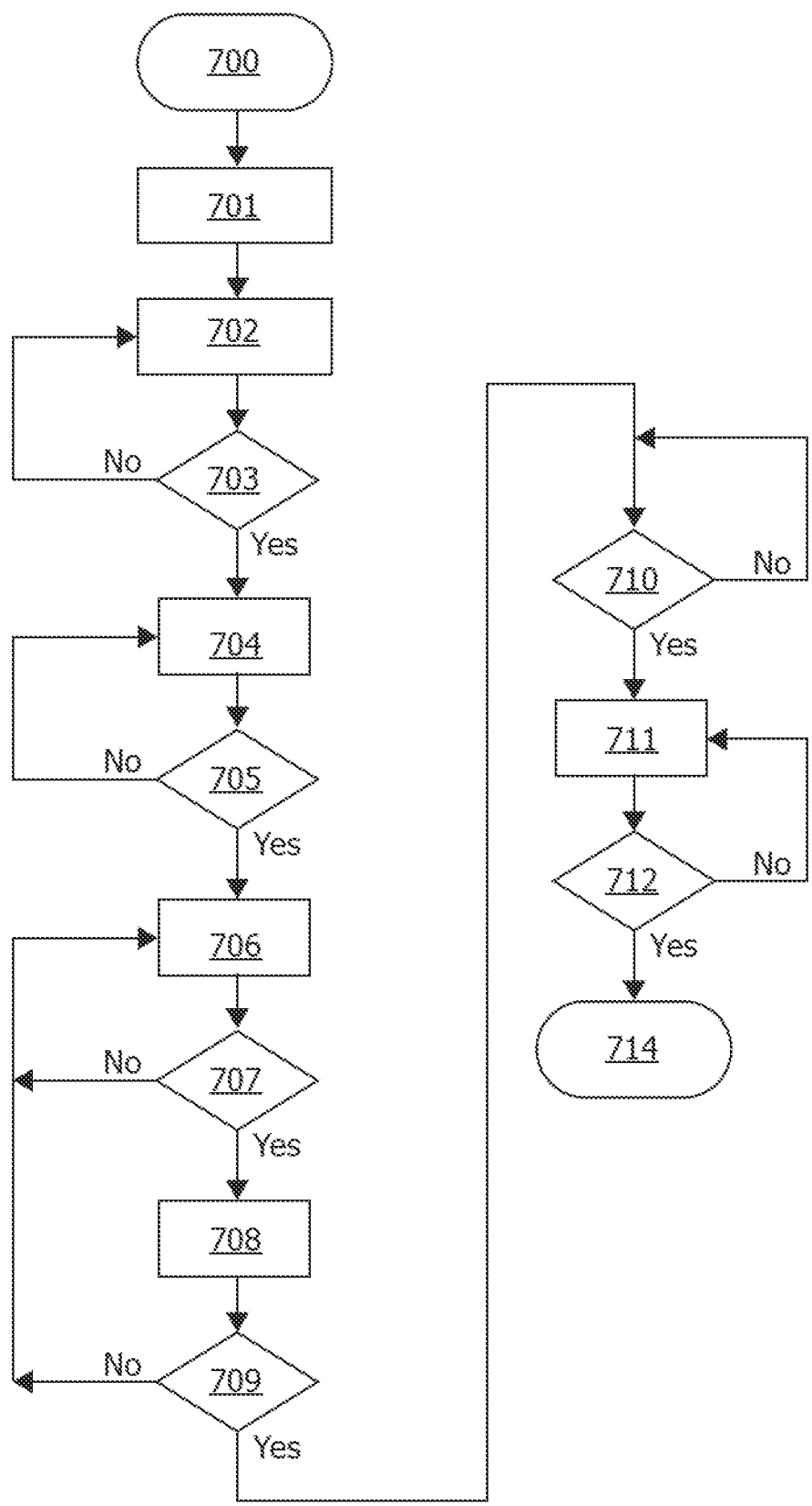
FIG. 7 is a flow-chart exemplary of steps or acts in a method of controlling an electronic converter according to the present disclosure.

One or more embodiments as exemplified in FIGS. 7 and 8 are directed at countering such an undesired "spurious" brown-in transition.

As exemplified in FIGS. 7 and 8, an improved method of functioning of the control circuit 20 may exploit the presence of the start-up circuit block 202 to provide an improved configuration of the control logic 206 in driving brown-in/brown-out transitions.

As exemplified in FIG. 2, the Start-up circuit block 202 can provide an auxiliary power supply and is capable to generate a supply current IHV between the HV node and the VCC pin in order to charge an external VCC capacitor.

In one or more embodiments, the logic circuit block 206 may be configured to activate periodically such a start-up circuit block 202 when the converter enters the brown-out state (e.g., BS="low"), framing VCC oscillating within thresholds VCCON and VCCOFF in order to ensure that the control circuit 20 receives a proper power supply, while the switching activity of the converter 10, 10a is interrupted.

For the sake of simplicity, one or more embodiments are discussed in the following mainly with respect to a case where at an initial time instant t3 the converter 10, 10a has just switched to the brown-out state.

As exemplified in FIG. 7, an improved method of functioning of the control circuit 20 may comprise:
  block 700: switching the converter from a brown-in state (BS="1") to a brown-out state (BS="0") and sensing 200 a signal HV, VD indicative of the input signal VIN;
  block 701: setting 203 the reference threshold signal VTH equal to the second reference threshold value VTHBI;
  block 702: activating the start-up circuit block 202 to draw or provide 202 a current IHV (e.g., with period TCC) from the first node HV of the control circuit 20, e.g., the current IHV having a minimum value IHVs (or a maximum value IHVc, as discussed in the following); as a result of the current value IHV, a voltage signal VCC at the biasing node from VCC varies from an upper limit voltage VCCON to a lower limit VCCOFF (and vice versa); specifically, the biasing signal VCC decreases from VCCON to VCCOFF when the current IHV is provided with the minimum value (e.g., IHV=IHVs);
  block 703: checking whether the biasing signal VCC has reached the minimum value VCCOFF and continuing to provide the current IHV; with the minimum value I_HVs until the biasing signal reaches the minimum voltage level VCC_OFF;
  block 704: if the biasing voltage VCC has reached the minimum value VCCOFF, for instance after a time interval TCC/2, providing the current IHV with the maximum current value IHVc until the biasing voltage VCC increases from VCCOFF to VCCON;
  block 705: checking whether the biasing signal VCC has reached the maximum value VCCON and continuing to provide the current IHV with the maximum value IHVc until the biasing signal reaches the maximum voltage level VCCON;
  block 706: if the biasing voltage VCC has reached back the maximum value VCCON, for instance after a time interval TCC, providing the current IHV with the minimum current value I_HVs until the biasing voltage VCC decreases again from VCCON to VCCOFF; if the biasing voltage VCC has reached the minimum value VCCOFF, going back to block 704;
  block 707: performing a comparison 204 of the voltage divider signal VD and the reference threshold signal VTH, e.g., VTH=VTHBI, and if the voltage divider signal VD fails to reach the selected threshold value VTH, providing the comparison signal OUTCOMP with a first, e.g., "low" or "0", value together with going back to block 706, and
  block 708: if the voltage divider signal VD reaches or exceeds the selected threshold value VTH, providing the comparison signal OUTCOMP with a second, e.g., "high" or "1", value; if the biasing voltage VCC has reached the minimum value VCCOFF, going back to block 704; block 709: detecting a time length in which comparison signal OUTCOMP remains in the first, e.g., "low", state, and
  block 709: if the detected time length fails to reach the second debounce time interval value TDBBI, maintaining the status signal BS, e.g., "low" or "0" and going back to block 706;
  block 710: if the detected time length reaches the second debounce time interval value TDBBI, checking whether the biasing signal VCC has reached the minimum value VCCOFF and continuing to provide the current IHV with the minimum value IHVs until the biasing signal reaches the minimum voltage level VCCOFF
  block 711: if the biasing voltage VCC has reached back the minimum value VCCOFF, providing the current IHV with the maximum current value IHVc until the biasing voltage VCC increases from VCCOFF to VCCON;
  block 712: checking that the biasing node VCC has a voltage level equal to the maximum voltage level VCCON, and
  block 714: when the biasing node has reached the maximum value VCCON, asserting the status signal BS, e.g., "high", causing the converter circuit 10, 10a to enter the brown-in state and the selector 203 to switch.

FIG. 8 is an exemplary time diagram of signals HV, OUTCOMP, BS, VTH, VCC and IHVSU at respective nodes HV, 204c, 206a, 204b, VCC and HV in one or more embodiments.

The behavior of signals in the time interval t0 to t3 is not discussed here for the sake of brevity, as the discussion in the foregoing with reference to FIGS. 4 and 6 applies mutatis mutandis.

As exemplified in FIG. 8, after entering brown-out at time instant t3, the start-up circuit block 202 is switched on, e.g., via signals from the logic circuit 206, so as to provide a biasing signal VCC as a supply signal oscillating between an upper VCCON and a lower VCCOFF level. As exemplified in FIG. 8, the biasing signal VCC has a period TCC which may be different from the period of the signal at the input node HV.

As exemplified in FIG. 8, at time instant t3:
  the reference threshold value VTHBI is selected as reference threshold VTH by the reference threshold selecting circuit block 203;
  the voltage spike Vos appearing when the converter is stopped due to non-idealities of the EMI filter 11 does not trigger any brown-in condition thanks to the blanking time interval corresponding to the first VCC discharge phase within a time interval Tcc after the status signal BS is asserted low.

As exemplified in FIG. 8, at time instant t4 the comparison signal OUTCOMP goes "high" (and remains high) for a duration reaching the second debounce time interval value TDBBI. Such a condition is mainly monitored during the VCC discharge phases, that is after the Tcc has elapsed. During these phases the start-up circuit block 202 sinks the IHVs current from the HV pin towards ground which keeps the voltage at the pin always locked to the input voltage. For instance, this current can discharge the capacities of the EMI filter 11. As a result, any residual offset or error on the peak Vpk" due to the overshoot Vos may be removed.

As exemplified in FIG. 8, if during the VCC discharge phase the voltage at the HV pin exceeds the brown-in threshold for an interval of time greater than the TDBBI debounce time then this event is memorized and the switching activity resumes at the next occurrence of the condition VCC=VCCON, e.g., at time t4'.

A solution as discussed with respect to FIGS. 7 and 8 has the further advantage of facilitating to select a small value for the second debounce time interval TDBBI leading to an effective brown-in threshold close to VHVBI.

As exemplified herein, a method of operating an electronic converter (for instance, 10, 10a) including a switching stage (for instance, LS, LP, L, M1) with an inductance (for instance, Lp, LS, L), the electronic converter having input terminals (for instance, 100a, 100b) configured to receive an AC input signal (for instance, VIN) from an energy source (for instance, 100) and having output terminals (for instance, 102a, 102b, 102c, 102d) configured to provide a DC output signal (VOUT) to a user circuit (ZL), said switching stage switchable (for instance, via a control signal GD applied thereto) between an active state and an inactive state based on a status signal (for instance, BS), the method comprising:
  producing (for instance, 300, 700) an input sensing signal (for instance, HV, VD) in response to said AC input signal being received at said input terminals,
  operating said electronic converter in one of a first and a second mode, wherein:
  a. in the first mode, said status signal is initially asserted to set said switching stage to said active state and the method includes:
    providing a first reference threshold value (for instance, VTHBO) and a first time value (for instance, TDBBO),
    de-asserting said control signal in response to an amplitude of said input sensing signal failing to reach said first reference threshold value for a time length (for instance, t2, t3) equal to said first time value,
  b. in the second mode said status signal is initially de-asserted to set said switching stage to said inactive state and the method includes:
    providing (for instance, CEXT) an auxiliary power supply signal (for instance, VCC) and periodically varying (for instance, 701) the auxiliary power supply signal with a variation period (for instance, TCC) and with a negative slope from an upper value (for instance, VCCON) to a lower value (for instance, VCCOFF) and with a positive slope from the lower value (for instance, VCCOFF) to the upper value (for instance, VCCON),
    providing (for instance, 702) a second reference threshold value (for instance, VTHBI) and a second time value (for instance, TDBBI),
    asserting (for instance, 706), after lapse (for instance, 703) of a time interval equal to said variation period (TCC), a comparison signal (for instance, OUTCOMP) in response to an amplitude of said input sensing signal reaching said second reference threshold value,
    performing a first check (for instance, 708) that said comparison signal is asserted for a time length (for instance, t4, t4') equal to said second time value,
    performing a second check (for instance, 710) that said periodically varying auxiliary power supply signal is varying with a negative slope at the time said comparison signal is asserted,
    based on a positive result of said first check and said second check, discontinuing periodically varying said auxiliary power supply signal and asserting said status signal.

In the method as exemplified herein, said second mode the method comprises:
  setting (for instance, 702) a reference threshold signal (for instance, VTH) equal to said second reference threshold value, and
  performing (for instance, 704) a first comparison (302) of an amplitude of said input sensing signal with said reference threshold signal, providing said comparison signal with a first comparison value in response to said amplitude of said input sensing signal reaching said reference threshold signal and with a second comparison value in response to said amplitude of said input sensing signal failing to reach said reference threshold signal.

In the method as exemplified herein, in said second mode, performing said first check comprises performing a second comparison (for instance, 306) between a time length (for instance, t4, t4') during which said comparison signal is asserted and said second time value.

In the method as exemplified herein, in said second mode, periodically varying said auxiliary power supply signal comprises, alternately:
  for a first portion of said variation period (TCC), providing an electrical current (IHV) having a first electrical current value (IHVS), and
  for a second portion of said variation period (TCC), providing said electrical current (IHV) having a second electrical current value (IHVC), said positive slope being a function of said second electrical current value (IHVS).

As exemplified herein, a control circuit (for instance, 20) for controlling a switching activity of a switching stage including an inductance of an electronic converter having input terminals configured to be coupled to an energy source to receive an AC input signal (for instance, VIN) therefrom and output terminals (for instance, 102a, 102b, 102c, 102d) configured to be coupled to a user circuit (for instance, ZL) to provide a DC output signal (for instance, VOUT) thereto, said switching stage (for instance, LS, LP, L, M1) switchable between an active state and an inactive state (for instance, via a control signal GD applied thereto) based on a status signal (for instance, BS), said control circuit (20) comprises:
  a first input node (for instance, HV) configured to be coupled to input terminals of the electronic converter to sense therefrom a sensing signal indicative of said input signal (for instance, VIN),
  a second input node (for instance, VCC) configured to be coupled to an auxiliary power supply source (for instance, CEXT) to receive an auxiliary power supply signal therefrom, and a first output node (for instance, GD) configured to be coupled to said switching stage of the electronic converter to control said switching activity thereof;

processing circuitry (for instance, 200, 202, 203, 204, 206) configured to operate said electronic converter according to the method according to one or more embodiments.

As exemplified herein, an electronic converter including a switching stage with an inductance, the electronic converter having input terminals coupled to an energy source to receive an AC input signal therefrom and having output terminals coupled to a user circuit to provide a DC output signal thereto, a switching activity of said switching stage being active or inactive based on a status signal, wherein the electronic converter is equipped with a control circuit (for instance, 20) according to one or more embodiments.

As exemplified herein, the electronic converter comprises:
a matching network (for instance, 11) coupled to said input terminals,
a rectifier bridge (for instance, 12) coupled to said matching network and to said output terminals via said switching stage,
wherein said a first input node of said control circuit is coupled, alternatively:
  to said matching network via a pair of diodes (for instance, D1, D2) wherein a first diode (for instance, D1) in said pair of diodes is intermediate said first input node and said matching network and a second diode (for instance, D2) in said pair of diodes is intermediate said first input node and said second input terminal,
  to an output node of said rectifier bridge (for instance, 12).

As exemplified herein, the electronic converter comprises a flyback converter (for instance, 10).

As exemplified herein, the electronic converter comprises a dual-stage converter (for instance, 10a) including a DC-DC electronic converter (for instance, 14) coupled to said switching stage, the DC-DC electronic converter having further output terminals (for instance, 102c, 102d) coupled to said user circuit.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection.

A method of operating an electronic converter (10, 10a) including a switching stage (LS, LP, L, M1) with an inductance (Lp, LS, L), the electronic converter (10, 10a) having input terminals (100a, 100b) configured to receive an AC input signal (VIN) from an energy source (100) and having output terminals (102a, 102b, 102c, 102d) configured to provide a DC output signal (VOUT) to a user circuit (ZL), said switching stage (LS, LP, L, M1) switchable between an active state and an inactive state based on a status signal (BS) may be summarized as including: producing (300, 700) an input sensing signal (HV, VD) in response to said AC input signal (VIN) being received at said input terminals (100a, 100b), operating said electronic converter in one of a first and a second mode, wherein: a. in the first mode, said status signal (BS) is initially asserted to set said switching stage (LS, LP, L, M1) to said active state and the method includes: providing a first reference threshold value (VTHBO) and a first time value (TDBBO), de-asserting said status signal (BS) in response to an amplitude of said input sensing signal (HV, VD) failing to reach said first reference threshold value (VTHBO) for a time length (t2, t3) equal to said first time value (TDBBO), b. in the second mode said status signal (BS) is initially de-asserted to set said switching stage (LS, LP, L, M1) to said inactive state and the method includes: providing (CEXT) an auxiliary power supply signal (VCC) and periodically varying (701) the auxiliary power supply signal (VCC) with a variation period (TCC) and with a negative slope from an upper value (VCCON) to a lower value (VCCOFF) and with a positive slope from the lower value (VCCOFF) to the upper value (VCCON), providing (702) a second reference threshold value (VTHBI) and a second time value (TDBBI), asserting (706), after lapse (703) of a time interval equal to said variation period (TCC), a comparison signal (OUTCOMP) in response to an amplitude of said input sensing signal (HV, VD) reaching said second reference threshold value (VTH), performing a first check (708) that said comparison signal (OUTCOMP) is asserted for a time length (t4, t4') equal to said second time value (TDBBI), performing a second check (710) that said periodically varying auxiliary power supply signal (VCC) is varying with a negative slope at the time said comparison signal (OUTCOMP) is asserted, based on a positive result of said first check (708) and said second check (710), discontinuing periodically varying said auxiliary power supply signal (VCC) and asserting said status signal (BS).

In said second mode the method may include: setting (702) a reference threshold signal (VTH) equal to said second reference threshold value (VTHBI), and performing (704) a first comparison (302) of an amplitude of said input sensing signal (HV, VD) with said reference threshold signal (VTH), providing (706) said comparison signal (OUTCOMP) with a first comparison value in response to said amplitude of said input sensing signal (HV, VD) reaching said reference threshold signal (VTH) and with a second comparison value in response to said amplitude of said input sensing signal (HV, VD) failing to reach said reference threshold signal (VTH).

In said second mode, performing said first check (708) may include performing a second comparison (306) between a time length (t4, t4') during which said comparison signal (OUTCOMP) is asserted and said second time value (TDBBI).

In said second mode, periodically varying said auxiliary power supply signal (VCC) may include, alternately: for a first portion of said variation period (TCC), providing an electrical current (IHV) having a first electrical current value (IHVS), and for a second portion of said variation period (TCC), providing said electrical current (IHV) having a second electrical current value (IHVC), said positive slope being a function of said second electrical current value (IHVS).

A control circuit (20) for controlling a switching activity of a switching stage (LS, LP, L, M1) including an inductance (Lp, LS, L) of an electronic converter (10, 10a) having input terminals (100a, 100b) configured to be coupled to an energy source (100) to receive an AC input signal (VIN) therefrom and output terminals (102a, 102b, 102c, 102d) configured to be coupled to a user circuit (ZL) to provide a DC output signal (VOUT) thereto, said switching stage (LS, LP, L, M1) switchable between an active state and an inactive state based on a status signal (BS), may be summarized as including: a first input node (HV) configured to be coupled to input terminals (100a, 100b) of the electronic converter (10, 10a) to sense therefrom a sensing signal (HV) indicative of said input signal (VIN), a second input node (VCC) configured to be coupled to an auxiliary power supply source (CEXT) to receive an auxiliary power supply signal (VCC) therefrom, and a first output node (GD) configured to be coupled to said switching stage (LS, LP, L, M1) of the electronic converter (10, 10a) to control said switching activity thereof; processing circuitry (200, 202, 203, 204, 206) configured to operate said electronic converter (10, 10a) according to the methods described herein.

An electronic converter (10, 10a) may be summarized as including a switching stage (LS, LP, L, M1) with an inductance (LS, LP, L), the electronic converter (10, 10a) having input terminals (100a, 100b) coupled to an energy source (100) to receive an AC input signal (VIN) therefrom and having output terminals (102a, 102b, 102c, 102d) coupled to a user circuit (ZL) to provide a DC output signal (VOUT) thereto, a switching activity of said switching stage (LS, LP, L, M1) being active or inactive based on a status signal (BS), wherein the electronic converter (10, 10a) is equipped with a control circuit (20) described herein.

The electronic converter (10, 10a) may include a matching network (11) coupled to said input terminals, a rectifier bridge (12) coupled to said matching network (11) and to said output terminals (102a, 102b) via said switching stage (LS, LP, L, M1), wherein said a first input node (HV) of said control circuit (20) is coupled, alternatively: to said matching network (11) via a pair of diodes (D1, D2) wherein a first diode (D1) in said pair of diodes is intermediate said first input node (HV) and said matching network and a second diode (D2) in said pair of diodes (D1, D2) is intermediate said first input node (HV) and said second input terminal (100b), to an output node of said rectifier bridge (12).

The electronic converter (10, 10a) may include a flyback converter (10).

The electronic converter (10, 10a), may include a dual-stage converter (10a) including a DC-DC electronic converter (14) coupled to said switching stage (LS, LP, L, M1), the DC-DC electronic converter (14) having further output terminals (102c, 102d) coupled to said user circuit (ZL).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating an electronic converter including a switching stage with an inductance, the electronic converter having input terminals configured to receive an AC input signal from an energy source and having output terminals configured to provide a DC output signal to a user circuit, said switching stage switchable between an active state and an inactive state based on a status signal, the method comprising:
generating an input sensing signal in response to said AC input signal being received at said input terminals; and
operating said electronic converter in a mode selected from a first mode and a second mode, wherein:

a. in case the electronic converter is in the first mode and the status signal is asserted to set said switching stage to said active state, the method includes:
providing a first reference threshold value and a first time value; and
de-asserting said status signal in response to an amplitude of said input sensing signal failing to reach said first reference threshold value for a time length equal to said first time value, and
b. in case the electronic converter is in the second mode and the status signal is de-asserted to set said switching stage to said inactive state, the method includes:
providing an auxiliary power supply signal and periodically varying the auxiliary power supply signal with a variation period such that the auxiliary power supply signal alternates between a negative slope from an upper value to a lower value and a positive slope from the lower value to the upper value in the variation period;
providing a second reference threshold value and a second time value;
asserting, after lapse of a time interval equal to said variation period, a comparison signal in response to the amplitude of said input sensing signal reaching said second reference threshold value;
performing a first check that said comparison signal is asserted for a time length equal to said second time value;
performing a second check that said periodically varying auxiliary power supply signal is varying with the negative slope at the time said comparison signal is asserted; and
based on a positive result of said first check and said second check, discontinuing periodically varying said auxiliary power supply signal and asserting said status signal.

2. The method of claim 1, wherein in case the electronic converter is in said second mode, the method comprises:
setting a reference threshold signal equal to said second reference threshold value; and
performing a first comparison of the amplitude of said input sensing signal with said reference threshold signal, providing said comparison signal with a first comparison value in response to said amplitude of said input sensing signal reaching said reference threshold signal and with a second comparison value in response to said amplitude of said input sensing signal failing to reach said reference threshold signal.

3. The method of claim 1, wherein in case the electronic converter is in said second mode, the method includes performing said first check includes performing a second comparison between a time length during which said comparison signal is asserted and said second time value.

4. The method of claim 1, wherein in case the electronic converter is in said second mode, the method includes periodically varying said auxiliary power supply signal includes, alternately:
for a first portion of said variation period, providing an electrical current having a first electrical current value; and
for a second portion of said variation period, providing said electrical current having a second electrical current value, said positive slope being a function of said second electrical current value.

5. The method of claim 4, wherein the first electrical current value is a non-zero electrical current value.

6. The method of claim 5, wherein, in case the electronic converter is in said second mode, the method comprises:
sinking an electrical current having the first electrical current value in response to the comparison signal being asserted after the variation period has elapsed.

7. A control circuit for controlling a switching activity of a switching stage including an inductance of an electronic converter having input terminals configured to be coupled to an energy source to receive an AC input signal therefrom and output terminals configured to be coupled to a user circuit to provide a DC output signal thereto, said switching stage switchable between an active state and an inactive state based on a status signal, said control circuit comprising:
a first input node configured to be coupled to the input terminals of the electronic converter to sense therefrom an input sensing signal indicative of said AC input signal;
a second input node configured to be coupled to an auxiliary power supply source to receive an auxiliary power supply signal therefrom;
a first output node configured to be coupled to said switching stage of the electronic converter to control said switching activity thereof; and
processing circuitry configured to: operate said electronic converter in a mode selected from a first mode and a second mode, wherein:
a. in case the electronic converter is in the first mode and said status signal is asserted to set said switching stage to said active state, the processing circuitry is configured to:
provide a first reference threshold value and a first time value; and
de-assert said status signal in response to an amplitude of said input sensing signal failing to reach said first reference threshold value for a time length equal to said first time value, and
b. in case the electronic converter is in the second mode and said status signal is de-asserted to set said switching stage to said inactive state, the processing circuitry is configured to:
periodically vary the auxiliary power supply signal with a variation period such that the auxiliary power supply signal alternates between a negative slope from an upper value to a lower value and a positive slope from the lower value to the upper value in the variation period;
provide a second reference threshold value and a second time value;
assert, after lapse of a time interval equal to said variation period, a comparison signal in response to the amplitude of said input sensing signal reaching said second reference threshold value;
perform a first check that said comparison signal is asserted for a time length equal to said second time value;
perform a second check that said periodically varying auxiliary power supply signal is varying with the negative slope at the time said comparison signal is asserted; and
based on a positive result of said first check and said second check, discontinue periodically varying said auxiliary power supply signal and asserting said status signal.

8. The control circuit of claim 7, wherein in case the electronic converter is in said second mode, the processing circuitry is configured to:
set a reference threshold signal equal to said second reference threshold value; and
perform a first comparison of the amplitude of said input sensing signal with said reference threshold signal, and
provide said comparison signal with a first comparison value in response to said amplitude of said input sensing signal reaching said reference threshold signal and with a second comparison value in response to said amplitude of said input sensing signal failing to reach said reference threshold signal.

9. The control circuit of claim 7, wherein in case the electronic converter is in said second mode, the processing circuitry is configured to perform said first check by performing a second comparison between a time length during which said comparison signal is asserted and said second time value.

10. The control circuit of claim 7, wherein in case the electronic converter is in said second mode, the processing circuitry is configured to periodically vary said auxiliary power supply signal by, alternately:
for a first portion of said variation period, providing an electrical current having a first electrical current value; and
for a second portion of said variation period, providing said electrical current having a second electrical current value, said positive slope being a function of said second electrical current value.

11. The control circuit of claim 10, wherein the first electrical current value is a non-zero electrical current value.

12. The control circuit of claim 11, wherein, in case the electronic converter is in said second mode, the processing circuitry is configured to:
sink an electrical current having the first electrical current value in response to the comparison signal being asserted after the variation period has elapsed.

13. An electronic converter, comprising:
a switching stage having an inductance;
input terminals coupled to an energy source and configured to receive an AC input signal therefrom;
output terminals configured to be coupled to a user circuit to provide a DC output signal thereto, a switching activity of said switching stage being in an active state or an inactive state based on a status signal; and
a control circuit configured to control the switching activity of the switching stage, the control circuit including:
a first input node configured to be coupled to the input terminals of the electronic converter to sense therefrom an input sensing signal indicative of said AC input signal;
a second input node configured to be coupled to an auxiliary power supply source to receive an auxiliary power supply signal therefrom;
a first output node configured to be coupled to said switching stage of the electronic converter to control said switching activity thereof; and
processing circuitry configured to: operate said electronic converter in a mode selected from a first mode and a second mode, wherein:
a. in case the electronic converter is in the first mode and said status signal is asserted to set said switching stage to said active state, the processing circuitry is configured to:
provide a first reference threshold value and a first time value; and
de-assert said status signal in response to an amplitude of said input sensing signal failing to reach said first reference threshold value for a time length equal to said first time value, and b. in case the electronic converter is in the second mode and said status signal is initially de-asserted to set said switching stage to said inactive state, the processing circuitry is configured to:

periodically vary the auxiliary power supply signal with a variation period such that the auxiliary power supply signal alternates between a negative slope from an upper value to a lower value and a positive slope from the lower value to the upper value in the variation period;

provide a second reference threshold value and a second time value;

assert, after lapse of a time interval equal to said variation period, a comparison signal in response to the amplitude of said input sensing signal reaching said second reference threshold value;

perform a first check that said comparison signal is asserted for a time length equal to said second time value;

perform a second check that said periodically varying auxiliary power supply signal is varying with the negative slope at the time said comparison signal is asserted; and based on a positive result of said first check and said second check, discontinue periodically varying said auxiliary power supply signal and asserting said status signal.

14. The electronic converter of claim 13, comprising:

a matching network coupled to said input terminals; and a rectifier bridge coupled to said matching network and to said output terminals via said switching stage, wherein said first input node of said control circuit is coupled, alternatively:

to said matching network via a pair of diodes, wherein a first diode in said pair of diodes is between said first input node and a first terminal of said input terminals and a second diode in said pair of diodes is between said first input node and a second input terminal of said input terminals, to an output node of said rectifier bridge.

15. The electronic converter of claim 13 comprising a flyback converter.

16. The electronic converter of claim 13, comprising a dual-stage converter including a DC-DC electronic converter coupled to said switching stage, the DC-DC electronic converter having further output terminals coupled to said user circuit.

17. The electronic converter of claim 13, wherein in case the electronic converter is in said second mode, the processing circuitry is configured to:

set a reference threshold signal equal to said second reference threshold value; and perform a first comparison of the amplitude of said input sensing signal with said reference threshold signal, and provide said comparison signal with a first comparison value in response to said amplitude of said input sensing signal reaching said reference threshold signal and with a second comparison value in response to said amplitude of said input sensing signal failing to reach said reference threshold signal.

18. The electronic converter of claim 13, wherein in case the electronic converter is in said second mode, the processing circuitry is configured to perform said first check by performing a second comparison between a time length during which said comparison signal is asserted and said second time value.

19. The electronic converter of claim 13, wherein in case the electronic converter is in said second mode, the processing circuitry is configured to periodically vary said auxiliary power supply signal by, alternately:

for a first portion of said variation period, providing an electrical current having a first electrical current value; and for a second portion of said variation period, providing said electrical current having a second electrical current value, said positive slope being a function of said second electrical current value.

20. The electronic converter of claim 19, wherein the first electrical current value is a non-zero electrical current value, and wherein, in case the electronic converter is in said second mode, the processing circuitry is configured to:

sink an electrical current having the first electrical current value in response to the comparison signal being asserted after the variation period has elapsed.

* * * * *